United States Patent [19]

Laude

[11] Patent Number: 4,671,607
[45] Date of Patent: Jun. 9, 1987

[54] DIVIDED FUNCTION OPTICAL COMPONENT FOR OPTICAL TELETRANSMISSIONS

[75] Inventor: Jean-Pierre Laude, St Cyr la Riviere, France

[73] Assignee: Instruments, S.A. of France, Paris, France

[21] Appl. No.: 559,606

[22] Filed: Dec. 8, 1983

[30] Foreign Application Priority Data

Dec. 8, 1982 [FR] France ................... 82 20547

[51] Int. Cl.$^4$ ............ G02B 6/26; G02B 6/42
[52] U.S. Cl. ................ 350/96.15; 350/96.19
[58] Field of Search ............. 350/96.15, 96.19

[56] References Cited

PUBLICATIONS

Gillham et al., "Fiber Optic Couplers for Multiplexing" *Photonics Spectra;* vol. 18, No. 4, Apr. 1984, pp. 45-52.

*Primary Examiner*—Robert E. Wise
*Attorney, Agent, or Firm*—Handal & Morofsky

[57] ABSTRACT

Divided function optical component, for optical telecommunications, of the type comprising optical fibers in conjugate object-image positions for regrouping or separating the light rays according to a given function. The component comprises simultaneously several groups of conjugate object-image fibers relative to the same regrouping or separation function. All the fibers are positioned in the same weak aberration area.

23 Claims, 9 Drawing Figures

DIVIDED FUNCTION OPTICAL COMPONENT FOR OPTICAL TELETRANSMISSIONS

CROSS-REFERENCE TO RELATED APPLICATIONS

This application is a continuation-in-part of copending United States patent application Ser. No. 514,386 of Laude entitled Compact Wavelength Multiplexer-Demultiplexer with Variable Filtration and filed July 15, 1983, and a continuation-in-part of U.S. patent application Ser. No. 514,390 of Laude entitled Optical Isolation Device for Multiplexing or Demultiplexing Wavelengths and filed July 15, 1983 and a continuation in part of U.S. Ser. No. 452,481 entitled Wavelength Selector and filed Nov. 23, 1982 of Laude, which is a continuation-in-part of U.S. Ser. No. 247,440 entitled Monochromator filed Mar. 25, 1981 but now abandoned of J. P. Laude, the disclosures of which applications are incorporated herein by reference.

FIELD OF THE INVENTION

The present invention relates to a divided function optical component for optical teletransmissions, more particularly intended for the mixing or the separation of optical signals in systems of teletransmission or teledistribution of data through optical fibers.

The important developments, realized or in the project phase, of teletransmission by the optical route lead to connecting each user to a transmission or relay center through optical transmission fibers each provided at their ends with an optical component intended to connect the modulated light emittor to the fiber to enable the light to enter therein, or to another end to collect the light to direct it to a detector which will decode the optical signal to convert it into an electrical or electronic signal usable in an ordinary receiver. For economic reasons, it is mostly desirable to make several signals pass simultaneously into the same fiber, which necessitates multiplexing upstream and demultiplexing downstream.

Thus, as shown diagrammatically in FIG. 1, if the three occupants A, B, C of a building are each connected to a telephone exchange through an optical line LA, LB, LC, this line will also be usable to connect them to another network, for example telex, the telephone signals and telex signals being of course carried by light rays of different wavelengths to avoid interference during their common course in the fiber. The line LA will hence end at a demultiplexer DA which will permit the separation of the telephone signals TA and the telex signals XA to the decoders and receivers of subscriber. A. It will be the same for subscribers B and C so that in this case it will be necessary to install three demultiplexers DA, DB and DC.

PRIOR ART

Apparatus is known which is capable of effecting such separations of light rays, and, for example, those described by French Patent Application No. 80-07849 and its two Certificates of Addition 80-20710 and 80-26465, in which a concave mirror and a diffraction grating are associated, or again French Patent Application Nos. 81-24211, 82-12438 and 82-12439 using selective mirrors with dielectric layers. However such components are of relatively high cost price and their multiplication in installations can constitute an economic handicap in the development of such technique.

The same type of problem is encountered in the case of optical cable distribution networks for television programs, as shown digrammatically in FIG. 2, where the lines $T_1$, $T_2$, $T_3$ each carrying one program must be distributed to at least two subscribers A and C of the same building. Here again it will be necessary, at the end of each line $T_1$, $T_2$, $T_3$ to pick up for each subscriber the portion of the transmitted signal, and it will be necessary to install three identical distributing components.

Components are also known which are capable of fulfilling this function, and for example, those described by French Patent Applications Nos. 81-08636 and 82-19284 using full or partial concave mirrors, whose centers are slightly offset. However, here again the mirrors which must be of great accuracy make such components relatively expensive.

SUMMARY OF THE INVENTION

It is an object of the present invention to enable the number of components necessary for an installation to be notably reduced, and consequently the overall cost of the installation to be reduced.

The invention therefore applies to an optical component of the type comprising optical fibers in conjugate relative object-image positions to regroup or separate the light rays according to a multiplexer/demultiplexer pattern defined by the structure of the component. According to the invention the component comprises simultaneously several groups of conjugate object-image fibers with the same pattern, all of the fiber groups being arranged in one weak aberation zone.

According to a preferred feature of the invention the input and output optical fibers are arranged in rectilinear strips (or rods) of juxtaposed fibers, several strips being themselves juxtaposable with one another.

BRIEF DESCRIPTION OF THE DRAWINGS

The invention will be better understood by referring to the particular applications given by way of example, and shown in the accompanying drawings.

In the drawings:

In FIG. 8 the fibers are juxtaposed in a single rectilinear strip; in FIG. 9 the fibers are distributed in a square arrangement.

DETAILED DESCRIPTION

Figure 1:
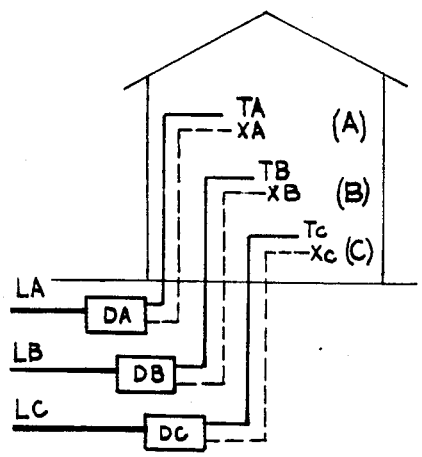
FIGS. 1 and 2, which have already been mentioned, are diagrammatic outlines of installations constructed according to prior techniques, respectively for the demultiplexing of multiple data transmitted through a line belonging to one subscriber, and for the simultaneous distribution to several subscribers of data carried by a general line.
Figure 3:
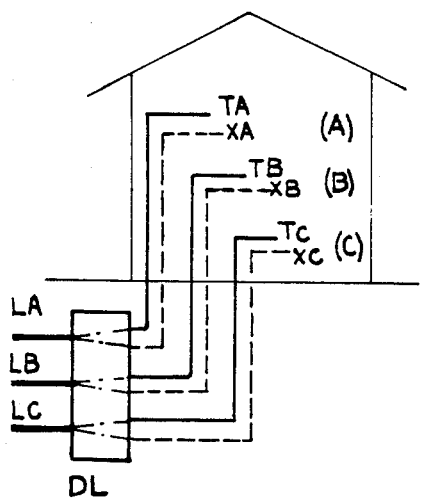
FIGS. 3 and 4, respectively homologous with FIGS. 1 and 2, demonstrate the reduction in the number of terminal components resulting from the employment of the invention.
Figure 4:
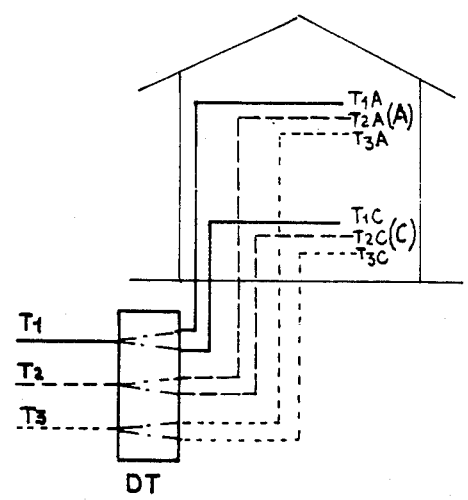
Figure 5:
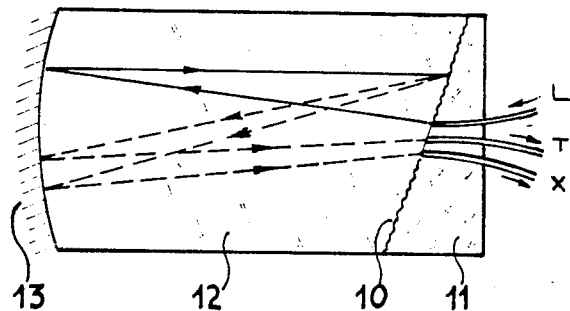
FIG. 5 is an outline of the structure of a demultiplexing component of known type.
Figure 6:
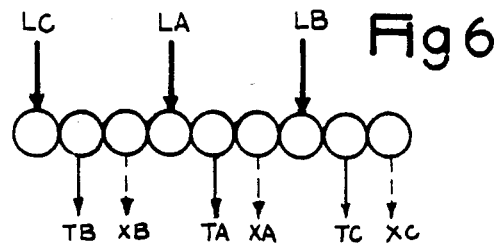
FIG. 6 shows, for this same component, a fiber distribution according to the invention enabling its capacity to be tripled.
Figure 7:
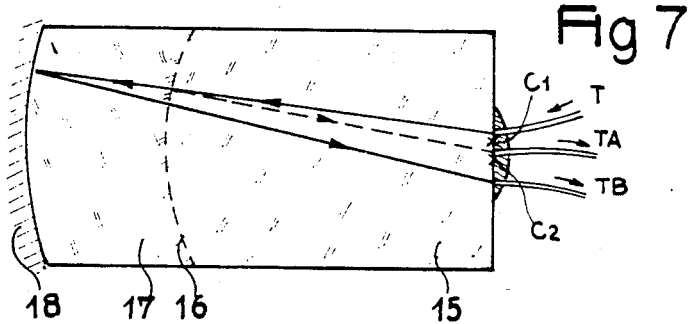
FIG. 7 is an outline of the structure of a distributing component of known type.
Figure 8:
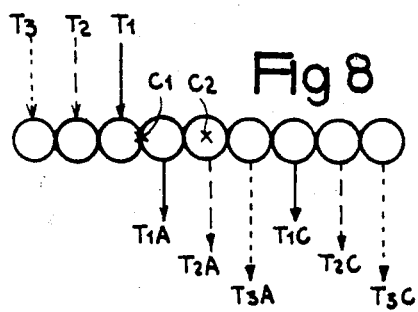
FIGS. 8 and 9 show, for this same component, two distributions of fibers according to the invention enabling its capacity to be tripled.
Figure 9:
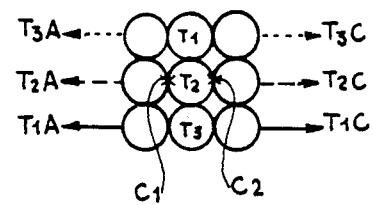

Reference will be first made to FIGS. 3, 5 and 6 for an application of the invention to the demultiplexing of two signals T and X carried by light rays of different wavelengths mixed in the transmission fiber L, the same operation having to be carried out for the three subscribers A, B and C. The usual component shown in FIG. 5, and used three times at DA, DB and DC in the diagram of FIG. 1 comprises, as described in detail in French Patent Application No. 80-26465, a grating for diffraction by reflection 10 formed on a block 11 and bonded to a block 12 whose other end forms a spherical or parabolic concave mirror 13. The transmission fiber L passes through the block 11 and its end comes, in a zone reserved for the grating, into the immediate vicinity of the focus of the mirror 13. The beam emitted through the end of the fiber L is reflected in a parallel beam to the grating 10 which disperses into several parallel beams according to the wavelengths which are themselves focused by the mirror 13, for example, onto the ends of the fibers T and X. The characteristics and the orientation of the grating 10 are determined to collect the desired wavelengths in the vicinity of the principal axis of the mirror 13, and the input fibers L and output fibers T and X are grouped in the vicinity of this axis where the aberrations are minimal.

According to the invention it is possible now to use this same component to process, by the same separation function, the three transmission fibers LA, LB and LC at the same time. The single component DL (FIG. 3) will be the same as that of FIG. 5 but will now include nine fibers of which the ends will be buried in the block 11 (three input fibers and six output fibers). The relative position of the various fibers is given in FIG. 6 where it is seen that the nine fibers are aligned side by side into a rectilinear strip which is positioned in the immediate vicinity of the focus of the mirror 13 and perpendicularly to the direction of the lines of the grating 10. This arrangement results from the use of fibers of an external sheath diameter of 0.125 mm, the wavelengths of the signals X and T being respectively 840 and 820 nm.

It is seen that by using the same component, in its same function, for three groups of conjugate object-image fibers it has been possible to economize two components practically without increasing the cost price of the improved component. It will also be noted that the total length of the strip of nine fibers is only of the order of 1.1 mm, that is to say that it would easily be possible, without departing from the area wherein aberrations remain acceptable, to use still longer strips, with about twenty fibers, which enables further multiplication of the capacity of such a component.

Figure 2:
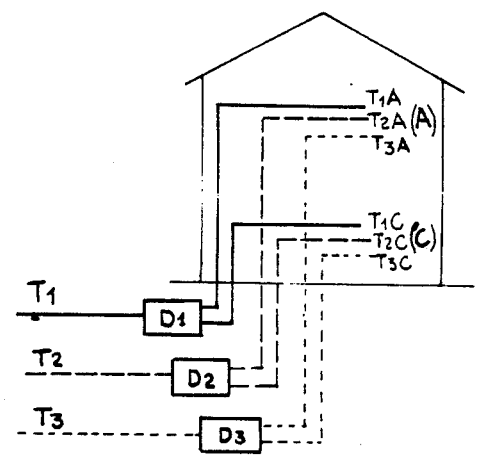

Similar results will be obtained in an application of the invention to the simultaneous distribution of data to several destinations as will be seen by referring now to FIGS. 4, 7, 8 and 9. The usual component shown in FIG. 7, and used three times in $D_1$, $D_2$ and $D_3$ in the diagram of FIG. 2, enables the distribution partly to TA and partly to TB of the light conducted through the transmission fiber T. As described in more detail in French Patent Application No. 82-19284, the component comprises a first block 15, on which a partial spherical mirror 16 is formed, bonded to a second block 17 on which is formed a second spherical mirror 18.

The centers $C_1$ of the mirror 16 and $C_2$ of the mirror 18 are located in the same plane as the ends of the fibers T, TA and TB and slightly offset with respect to one another. The rays emerging from the end of T which encounter the reflecting zones of the mirror 16 form the image of T on the fiber TA symmetrical with T relative to $C_1$. The rays which pass into the transparent zones of 16 form another image of T on the fiber TB symmetrical with T relative to $C_2$.

According to the invention it is possible now to use the same component to process, by the same distribution function, at the same time the three transmission fibers $T_1$, $T_2$, and $T_3$. The single component DT (FIG. 3) will be the same as that of FIG. 6, but will now comprise nine fibers (three input and six output). One possible way of positioning the fibers is given in FIG. 8 where as previously a rectilinear strip of nine juxtaposed fibers is used. Another possibility of fiber arrangement is given in FIG. 9 with positioning in a square.

Here again, by using the same component, in its same function, three groups of conjugate object-image fibers, two components out of three ae economized, and the economy can be still greater by using an increased number of fibers.

Of course, the invention is not strictly limited to the embodiments which have been described by way of example, but applies also to constructions which only differ therefrom in detail, to modifications of construction or to the use of equivalent means.

Thus it applies under the same conditions to any optical components in which optical fibers are used in conjugate object-image relative positions to regroup or separate light rays according to a function defined by the structure of the component. It will be possible in all cases to use simultaneously several groups of conjugate object-image fibers relative to the same function, the only limitation being not to exceed, for the ends of the fibers, the zone where the aberrations remain at an acceptable level.

All the examples described above have been in uses for separating light rays, but it is obvious that the applications are identical when it relates to regrouping one or several light rays in traansmissin fibers. The components with a divided function according to the invention can also include at the same time fiber groups used in the sense of separation of light rays and groups in the reverse sense to regroup the light rays.

I claim:

1. A divided function optical component, for optical telecommunications, of the type comprising optical fibers in conjugate object-image relative positions with respect to focusing optical means for regrouping or separating light rays according to a wavelength separating and a focusing function defined by the structure of the component, said component comprising simultaneously more than one group of conjugate object-image fibers performing the same multiplexer/demultiplexer function, all the fiber groups being arranged in the weak aberration area proximate the optical axis associated with the focusing function.

2. An optical component according to claim 1, wherein all of the optical object and image fibers are arranged as a rectilinear strip of juxtaposed fibers.

3. An optical component according to claim 1, wherein all of the optical object and image fibers are arranged as severaljuxtaposed rectilinear strips, each strip being itself constituted by a juxtaposition of fibers.

4. An optical component as in claim 1 wherein said optical means is a solid transparent member integrally associated with a focusing surface, wavelength separating means and said fibers.

5. A device, comprising:
(a) solid transparent member having first and second ends, said first end being configured and dimensioned to form a support for a focusing surface;
(b) reflective means, adjacent said first end, for forming a reflective focusing surface;
(c) first light conducting means positioned proximate said second end and positioned at a first path end of a first path along which light is sent or received, said first path end being centered on a first point and said first path extending toward said reflective focusing surface;
(d) diffraction grating means disposed adjacent said second end, for diffracting light of different wavelengths incident on said grating means along said path from said reflective means and reflecting it at different angles as a function of wavelength further along said path back toward said reflective means; and
(e) second light conducting means proximate said second end and positioned at the end of said first path opposite said first path end of said first path, said first path extending from said first light conducting means to said reflective means, from said reflective means to said grating means from said grating means to said reflective means, and from said reflective means to said second light conducting means, said second light conducting means comprising second and third optic fibers, centered on second and third points, respectively, corresponding to opposite path ends for light of different wavelengths, said opposite path ends being coincident with the focal point of the paths followed by light of said different wavelengths exiting from said first light conducting means;
(f) third light conducting means positioned proximate said second end and positioned at a second path end of a second path along which light is sent or received, said second path end being centered on a fourth point and said second path extending toward said reflective focusing surface; and
(g) fourth light conducting means proximate said second end and positioned at the end of said second path opposite said second path end of said second path, said second path extending from said third light conducting means to said reflective means, from said reflective means to said grating means, from said grating means to said reflective means, and from said reflective means to said fourth light conducting means, said fourth light conducting means comprising optic fibers, centered on fifth and sixth points, respectively, corresponding to opposite path ends for light of different wavelengths, said opposite path ends being coincident with the focal point of the paths followed by light of said different wavelengths exiting from said third light conducting means.

6. The device of claim 5, wherein all of said points are separated from adjacent points by a substantially uniform distance.

7. The apparatus of claim 5, further comprising:
(h) fifth light conducting means positioned proximate said second end and positioned at a third path end of a third path along which light is sent or received, said third path end being centered on a seventh point and said third path extending toward said reflective focusing surface; and
(i) sixth light conducting means proximate said second end and positioned at the end of said third path opposite said third path end of said third path, said third path extending from said fifth light conducting means to said reflective means, from said reflective means to said grating means, from said grating means to said reflective means, and from said reflective means to said sixth light conducting means, said sixth light conducting means comprising optic fibers, centered on eighth and ninth points, respectively, corresponding to opposite path ends for light of different wavelengths, said opposite path ends being coincident with the focal point of the paths followed by light of said different wavelengths exiting from said fifth light conducting means.

8. The apparatus of claim 7 wherein all of said points are disposed in a line separated from adjacent points by a substantially uniform distance.

9. A device as in claim 7, wherein said first, second, third, fourth, fifth, sixth, seventh, eighth and ninth points all lie substantially in-line with each other.

10. A device as in claim 9, wherein said points follow the following order:
(i) first point;
(ii) sixth point;
(iii) fifth point;
(iv) seventh point;
(v) eighth point;
(vi) ninth point;
(vii) fourth point;
(viii) second point; and
(ix) third point.

11. A device as in claim 10, wherein said points are uniformly spaced with respect to adjacent points.

12. A device as in claim 5, wherein said optic fibers are disposed in contact with said solid transparent member.

13. A device as in claim 12, wherein said optic fibers are positional proximate the center of curvature of said reflective focusing surface.

14. A device, comprising:
(a) a solid transparent member having first and second ends, said first end being configured and dimensioned to form a support for a focusing surface;
(b) reflective means, adjacent said first end, for forming a reflective focusing surface, said focusing surface having a center of curvature or the equivalent of a center of curvature;
(c) first light conducting means positioned proximate said second end and positioned at a first path end of a first path along which light is sent or received, said first path end being centered on a first point and said first path extending toward said reflective focusing surface;
(d) color responsive focusing means for reflecting light of a first wavelength which is emitted by said first light conducting means, said color responsive focusing means passing an other wavelength of light, said color responsive focusing means having a center of curvature at a different position in space from the position of the center of curvature of said focusing surface;
(e) second light conducting means proximate said second end and positioned at the end of said first path opposite said first path end of said first path, said first path extending from said first light conducting means to said reflective means for light of said other wavelength and said first path extending from said first light conducting means to said color responsive focusing means for light of said first wavelength, from said reflective means for light of said other wavelength and from said color responsive focusing means for light of said first wavelength, to second and third points for said other and first wavelengths, respectively, said second light conducting means comprising second and third optic fibers, centered on said second and third points, respectively, corresponding to opposite path ends for light of said other and first wavelengths, said opposite path ends being coincident with the focal point of the paths followed by light of said other and first wavelengths passing through said first light conducting means;

(f) third light conducting means positioned proximate said second end and positioned at a second path end of a second path along which light is sent or received, said second path end being centered on a fourth point and said second path extending toward said reflective focusing surface said fourth point being displaced from said first point; and (g) fourth light conducting means proximate said second end and positioned at the end of said second path opposite said second path end of said second path, said second path extending from said third light conducting means to said reflective means for light of said other wavelength and from said third light conducting means to said color responsive focusing means for light of said first wavelength, from said reflective means for light of said other wavelength and from said color responsive focusing means for light of said first wavelength to fifth and sixth points, respectively, said fourth light conducting means comprising optic fibers, centered on said fifth and sixth points for said other and first wavelengths, respectively, corresponding to opposite path ends for light of said other and first wavelengths, said opposite path ends being coincident with the paths followed by light of said other and first wavelengths passing through said third light conducting means.

15. A device as in claim 14, further comprising:

(h) fifth light conducting means positioned proximate said second end and positioned at a third path end of a third path along which light is sent or received, said third path end being centered on a seventh point and said third path extending toward said reflective focusing surface, said seventh point being displaced from said first and fourth points; and (i) sixth light conducting means proximate said second end and positioned at the end of said third path opposite said third path end of said third path, said third path extending from said fifth light conducting means to said reflective means for light of said other wavelength and said third path extending from said fifth light conducting means to said color responsive focusing means for light of said first wavelength, from said reflective means for light of said other wavelength and from said color responsive focusing means for light of said first wavelength to eighth and ninth points for said other and first wavelengths, respectively, said sixth light conducting means comprising optic fibers, centered on said eighth and ninth points, respectively, corresponding to opposite path ends for light of said other and first wavelengths, said opposite path ends being coincident with the paths followed by light of said other and first wavelengths passing through said fifth light conducting means.

16. A device as in claim 15, wherein all of said points are disposed in a line separated from adjacent points by a substantially uniform distance.

17. A device as in claim 15, wherein said first and second points are symmetrical about the center of curvature or the equivalent of a center of curvature of said focusing surface, said fourth and fifth points are symmetrical about the center of curvature or the equivalent of a center of curvature of said focusing surface, said seventh and eighth points are symmetrical about the center of curvature or the equivalent of a center of curvature of said focusing surface, said first and third points are symmetrical about the center of curvature or the equivalent of a center of curvature of said color responsive focusing surface, said fourth and sixth points are symmetrical about the center of curvature or the equivalent of a center of curvature of said color responsive focusing surface, and said seventh and ninth points are symmetrical about the center of curvature or the equivalent of a center of curvature of said focusing surface.

18. A device as in claim 17, wherein said points form a three-by-three matrix.

19. A device as in claim 18, wherein said points are positioned in three rows of three points each the top row following the order;
 (i) eighth point;
 (ii) first point; and
 (iii) ninth point;
the middle row following the order;
 (iv) fifth point;
 (v) fourth point; and
 (vi) sixth point; and
the bottom row following the order;
 (vii) second point;
 (viii) seventh point; and
 (ix) third point.

20. A device as in claim 19, wherein the center of curvature of said color responsive focusing surface is centered between said fourth and sixth points and said center of curvature of said focusing surface is centered between said fourth and fifth points.

21. A device as in claim 17, wherein said points are in a linear configuration.

22. A device as in claim 21, wherein said points follow the following order:
 (i) first point;
 (ii) fourth point;
 (iii) seventh point;
 (iv) ninth point;
 (v) sixth point;
 (vi) third point;
 (vii) eighth point;
 (viii) fifth point; and
 (ix) second point.

23. A device as in claim 22, wherein said center of curvature of said color responsive focusing surface is centered between said seventh and ninth points and said center of curvature of said focusing surface is centered on said sixth point.

* * * * *